Figure 1:
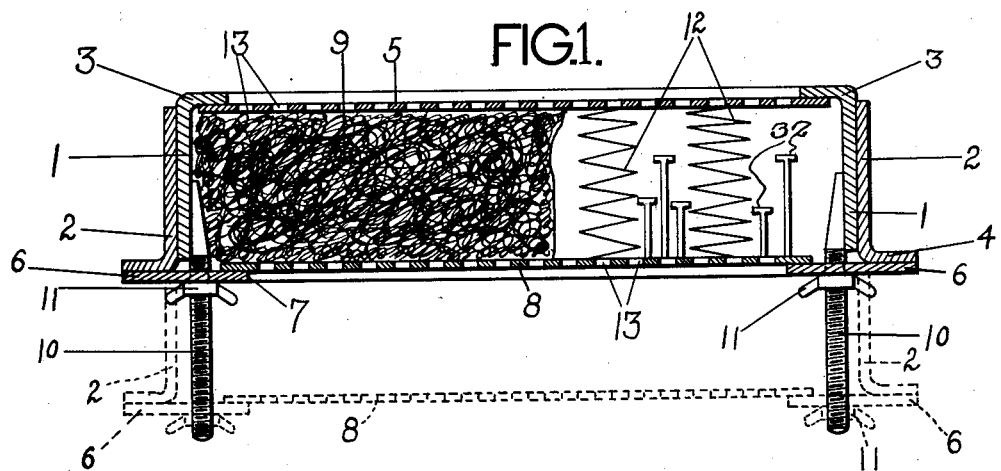

Dec. 22, 1925.    1,566,607
A. JORDAHL
AIR FILTER
Filed April 25, 1924    2 Sheets-Sheet 1

Inventor
Anders Jordahl
By Emil Bönnelycke
Attorney

Dec. 22, 1925.

A. JORDAHL

AIR FILTER

Filed April 25, 1924      2 Sheets-Sheet 2

1,566,607

Inventor
Anders Jordahl

By Emil Bönnelycke
Attorney

Patented Dec. 22, 1925.

1,566,607

UNITED STATES PATENT OFFICE.

ANDERS JORDAHL, OF NEW YORK, N. Y.

AIR FILTER.

Application filed April 25, 1924. Serial No. 708,998.

*To all whom it may concern:*

Be it known that I, ANDERS JORDAHL, subject of the King of Norway, residing at New York, in the county and State of New York, have invented certain new and useful Improvements in Air Filters, of which the following is a specification.

Filters of the dry or semi-dry type for the removal of dust, dirt and other impurities from air and gases must be washed or cleaned from time to time in order to remove the accumulated impurities. Such filters are generally arranged in the form of units and thus one or more units can be removed from the installation for the purpose of cleaning while enabling the other units to perform their functions, the open spaces being replaced by spare units or they can be covered by suitable plates. In order to enable such filters to stay in service as long as possible between each washing and in order at the same time to obtain the highest possible cleaning efficiency, the filter medium must have a considerable depth and should preferably be arranged in groups or layers of progressively finer porosity from the front toward the rear of the filter unit. Filter units have heretofore been washed as a whole by dipping the complete filter cell into a tank filled with warm water but in this process some of the dirt from the front part of the filter medium has a tendency to be carried into the rear parts where it is almost impossible to dislodge it by any simple washing process. In order to overcome this difficulty I arrange my filter as a unit of separately washable filter cells so that these individual cells can be made comparatively thin and therefore easy to wash. In this unit the rear cell, which contains the least porous filter medium, will accumulate the smallest amount of impurities and the finest quality of dust and is therefore easy to clean which, however, would be very difficult if inseparably connected or integral with the front cell which of course accumulates a great deal more dust.

These units can be arranged to contain two or more cells removably attached at various points to the filter frames, in which case they must be taken out of the installation separately or they can all be arranged as parts of the main filter cell, wherein the unit is taken out of the installation in its entirety, then separated, separately washed, reassembled and then inserted into the installation as one complete unit.

A further object of this invention relates to such filters in which a fibrous or compressible material is used for the filter medium, such for instance as metal or slag wool, asbestos, animal or vegetable fibre, sponges, loosely matted felt, crimped wires or any other material which can serve as a filter medium and which has some compressible property. Such filter media have proved very efficient in leaching out solid impurities, and it is evident that their efficiency in this respect can be materially increased by compressing the filter medium to a certain extent so that the size of the voids or pores can be reduced in size. One of the great drawbacks of using the above-mentioned filter media has been in removing the accumulated solid impurities by a simple washing or cleaning process for the reason that many of such particles are either jammed in between adjoining fibre strands or become enclosed in voids from which there are no outlets of sufficient size to permit them from being carried along with the washing water or cleaning fluid. To overcome these difficulties I arrange my filter cell containing the filter medium in such a way that it can be compressed or expanded to any desired extent or degree, the object being that it be compressed when placed in service so that any degree of fineness can be obtained and that it be expanded for the purpose of cleaning or washing, thus assuring large openings for the circulation of the cleaning fluid.

A still further object of this invention is to provide a filter which will expand when the telescoping frames are released so that a filter medium can be used which has very little expansive and compressive properties and the object is attained by the use of springs arranged at suitable intervals in the cell. Also hooks or other suitable devices can be secured to the screens to further loosen the filter medium by pulling layers apart in expanding the cell.

Another object of this invention is to provide a filter unit which can be easily and quickly taken apart and can be constructed with a minimum number of parts. Such a construction can take the form of a unit having a front cell which is not expansible and one or more expansible rear cells, the front cell in this arrangement being filled with perforated sheets, hollow steel cylinders, or other non-springy filter media, and the rear cells being filled with a compressible filter medium.

Figure 2:
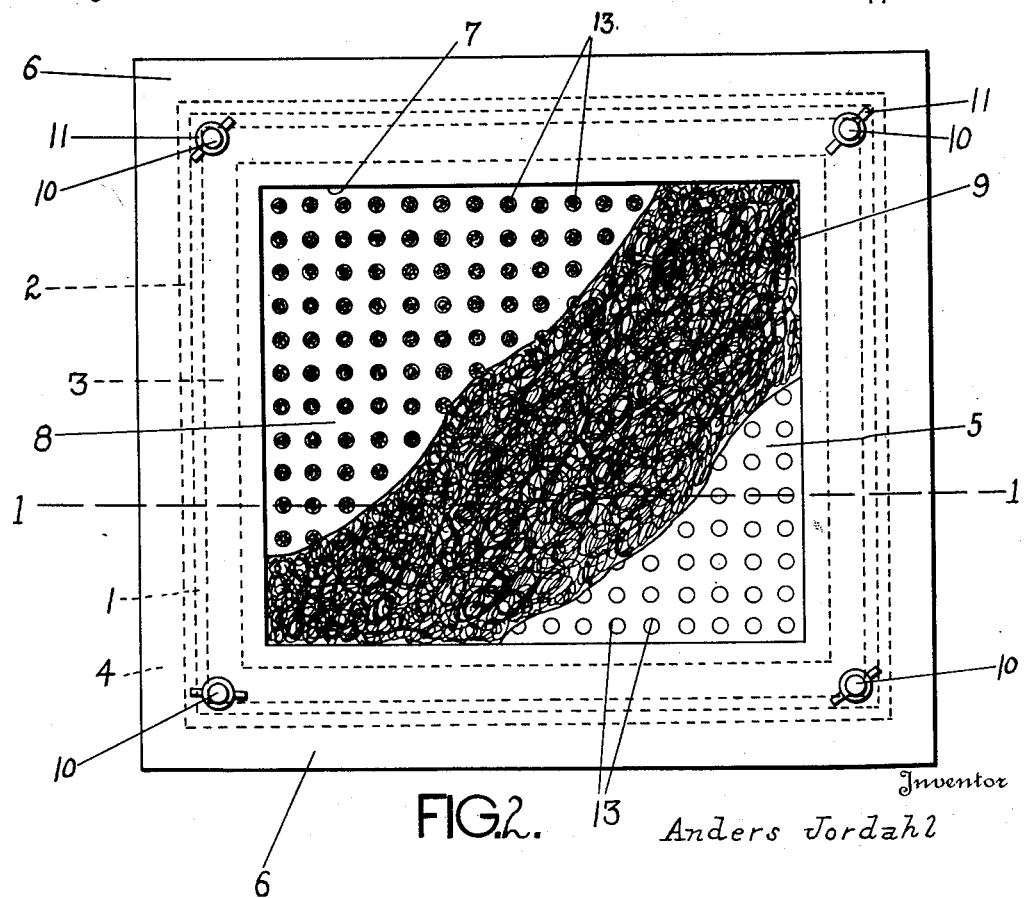
Figure 4:
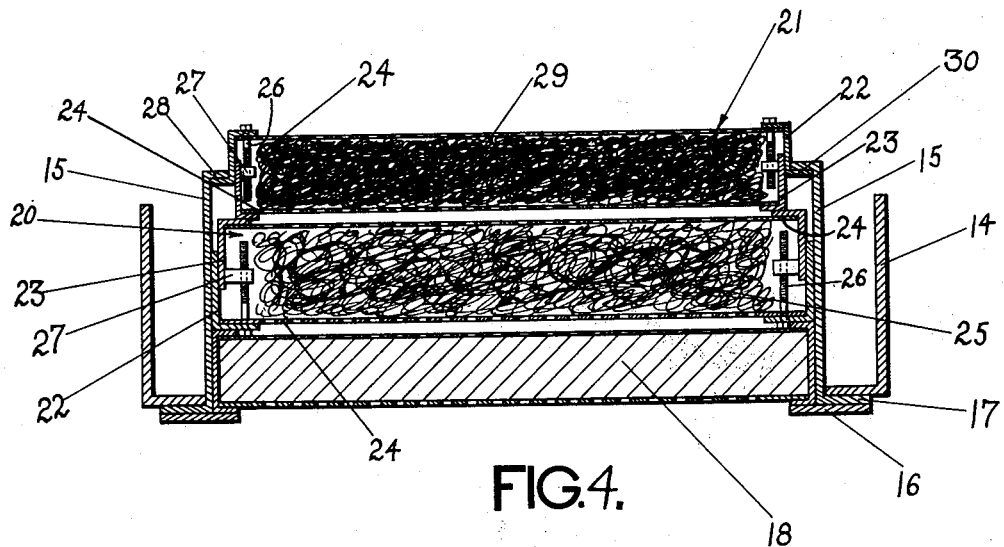
Figure 3:
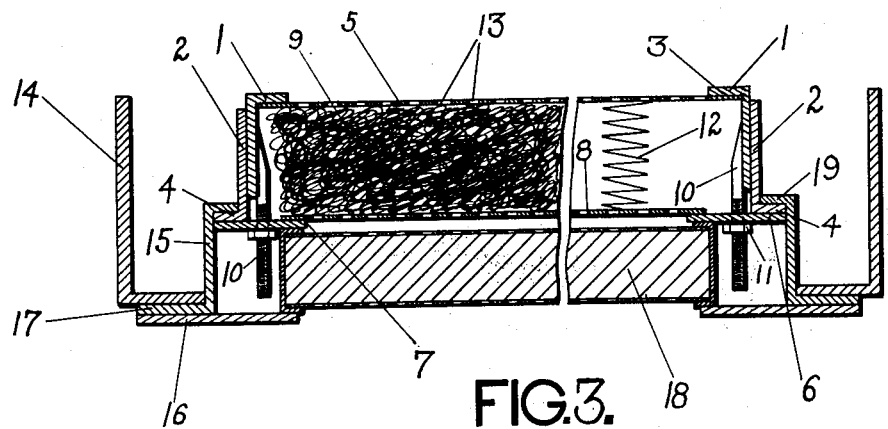

Other objects will be apparent from the following specification, taken in connection with the accompanying drawing in which like reference characters indicate corresponding parts throughout, and in which, Fig. 1 is a vertical cross section of a filter unit taken on line 1—1 of Fig. 2, Fig. 2 is a front view of the unit, Fig. 3 is a cross section of a filter unit having an expansible and a non-expansible filter cell, and Fig. 4 is a cross section of a modified form of filter unit.

My filter apparatus is preferably built in the form of units and since this invention relates to the specific structure of this unit the drawing and disclosure have been limited thereto. One form of this unit is preferably built of two telescoping frames 1 and 2, frame 1 being the inside frame and 2 indicating the outside frame. Each of these frames has a right-angle bent portion 3 and 4 respectively and to the bent portion 3 is secured in any suitable manner a screen 5. A plate member 6 is secured to the bent portion 4 of frame 2 and is provided with a central opening indicated at 7. Over this opening 7 is secured a screen 8, said screens forming the inside and outside retaining members for the filter medium and having openings 13 therein. At suitable intervals but preferably in the corners of frame 1 are secured the retaining bolts 10 which are adapted to project through holes in the plate member 6 and on these bolts plain or winged nuts 11 are provided in order to lock the frames and therefore the screens in any desired position and to compress the filter medium 9 to any desired degree.

Figures 1, 2 and 3 of the drawing have been broken away in part in order to show in Figs. 1 and 3 the springs 12 by showing the filter medium 9 only in a part of the cell, and Fig. 2 to show screen 5 and the filter medium 9 by breaking away a part of screen 8 and in turn a part of the filter medium 9.

In operation the filter unit is assembled as shown in full lines in Fig. 1, that is, with the nuts drawn up in order to obtain the desired compression in the filter medium 9, but when it is desired to clean this filter medium the nuts 11 are turned counterclockwise with the result that the filter medium 9 will force the frame 2 to slide over frame 1 and thus frame 2, plate 6 and screen 8 will assume the position shown in dotted lines in Fig. 1. The filter medium can thus be cleaned by running or forcing water or any other cleaning fluid through the holes 13 and through the pores or voids of the medium. Furthermore, the nuts can be entirely removed for the purpose of refilling the filter or for further cleaning. It is, of course, understood that the filter unit is taken out of the installation when the cell is to be cleaned and this can be attained by handling the unit by the bolts 10 or by any suitable handles, not shown. The springs 12 are inserted between the screens 8 and 5 and in the filter medium when a medium is used which is only slightly compressible, the springs thus not only forcing the screens apart, but will also force the filter medium apart due to its intimate contact therewith. If, however, it is desired to provide further means for forcing the medium apart, hooks 32 of different lengths can be secured to the screen 8.

Fig. 3 shows a filter cell mounted in frames 14 of the installation comprising the foregoing described expansible filter cell mounted in a main frame portion 15. A plate portion 16 is removably secured to the right-angle bent portion 17 of the frame portion 15, said plate 16 being adapted to secure the filter cell 18 in place and it in turn securing the expansible cell in place against the right angle bent portion 19 of frame 15. This cell 18 preferably contains a non-compressible medium such as steel cylinders while the expansible cell contains some compressible filter medium. However, any suitable combination can be used as well as any number of cells as for instance the three cells of Fig. 4. In this modified form of the invention the unit comprises the frame portion 15 having a plate portion 16 removably secured thereto by means of the right-angle bent portion 17. As in the unit of Fig. 3 this unit also consists of a non-compressible filter cell 18 and in addition two compressible cells 20 and 21 removably mounted in frame 15. The cell 20 comprises two telescoping frame members 22 and 23, each one of which has a perforated plate 24 secured thereto, which is adapted to secure the filter medium 25 in place. The frame member 23 has a stationary nut 27 secured thereto into which is threaded the bolt 26, said bolt serving the purpose of compressing the filter medium 25 by drawing the screens 24 towards each other. The cell 21 also comprises two telescoping frames 22 and 23, frame 22 having a right-angle portion 30 which abuts against the right-angle portion 28 of frame 15 and further has the screens 24, stationary nuts 27 and bolts 26 as in cell 20. The filter medium 29, however, is of a finer quality than the filter medium 25 in cell 20 so that the very finest particles of dust which have passed through cells 18 and 20 will lodge in this medium 29. Therefore any suitable number of cells or combination thereof can be used, depending upon the nature of the air or gas to be filtered and to the density of dust or impurities contained therein. When it is desired to clean and wash this unit the cells 18, 20 and 21 are removed from frame 15 and the cells are then individually washed, the cells 20 and 21 being first expanded by means of the telescoping frames.

I claim as my invention:

1. An air and gas filter comprising a main frame; and a plurality of filter units mounted in said frame, one of said units being removably supported, and comprising a pair of screens, a filter medium between said screens, and means for regulating the degree of compression of said filter medium, so that said unit may be cleaned as a self-contained unit when removed from the main frame.

2. An air and gas filter comprising a main frame; and a plurality of filter units removably secured in said frame and arranged in series, each of said filter units comprising a pair of screens, a filter medium between said screens, and means for regulating the degree of compression of said filter medium, so that each of said units may be cleaned as a self-contained unit when removed from said main frame.

3. An air and gas filter comprising a main frame; and a plurality of filter units mounted in said main frame, one of said units being removably mounted and including a pair of telescoping frames and means for adjusting the telescoping frames, so that the unit may be cleaned as a self-contained unit when removed from the main frame.

4. An air and gas filter comprising a main frame; and a plurality of filter units removably mounted in said frame and arranged in series, each of said filter units including a pair of telescoping frames, and means for adjusting the telescoping frames, so that said units may be be cleaned as self-contained units when removed from the main frame.

5. An air and gas filter comprising a main frame; and a plurality of filter units removably mounted in said frame and arranged in series, each of said filter units comprising a pair of telescoping frames, a screen secured to each telescoping frame, a filter medium between said screens, and means for adjusting the telescoping frames, so that they may be cleaned as self-contained units when removed from the main frame.

6. An air filter comprising an inside frame having a right-angle bent portion; an outside frame having a right-angle bent portion and adapted to fit over said inside frame member; a screen secured to said bent portion of said inside frame; a plate member secured to the bent portion of said outside frame; a screen secured to said plate portion; a filter medium between said screens; and means for placing said filter medium under compression.

7. An air and gas filter comprising a main frame; and a plurality of filter units removably mounted in said frame and arranged in series, each of said filter units including a pair of telescoping frames, and a threaded bolt for adjusting the telescoping frames, so that they may be cleaned as self-contained units when removed from the main frame.

8. An air and gas filter comprising a main frame; and a plurality of filter units removably mounted in said frame and arranged in series, each of said filter units comprising a pair of telescoping frames, a filter medium between said screens, and a threaded bolt for adjusting the telescoping frames, so that they may be cleaned as self-contained units when removed from the main frame.

9. An air filter comprising a frame; a filter medium in said frame; springs in said frame for causing expansion of said filter medium; and means for further loosening said filter medium.

10. An air filter comprising a telescoping frame; a filter medium in said frame; and a plurality of hooks on said frame for loosening said filter medium when said frame is expanded.

In testimony whereof I affix my signature.

ANDERS JORDAHL.